April 25, 1961

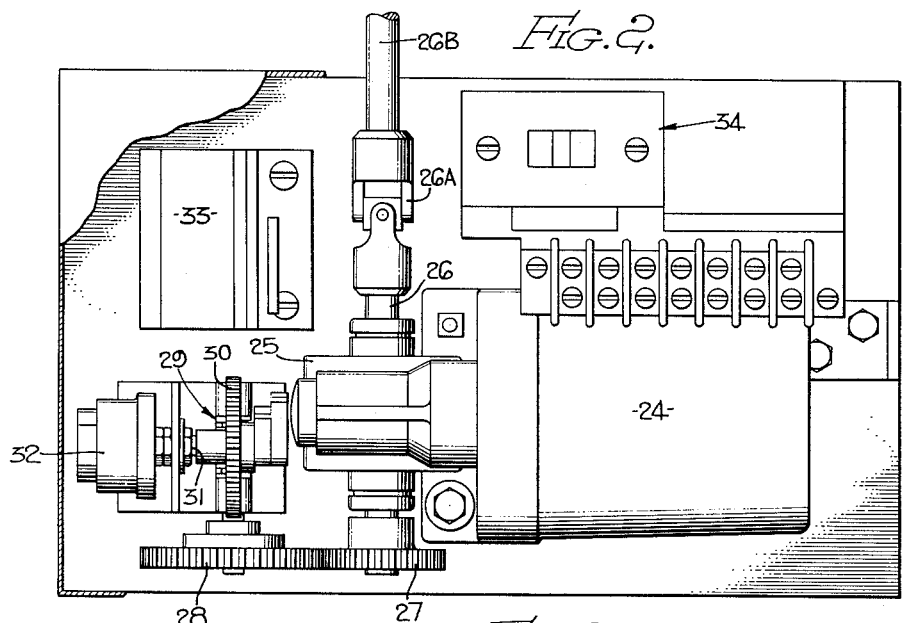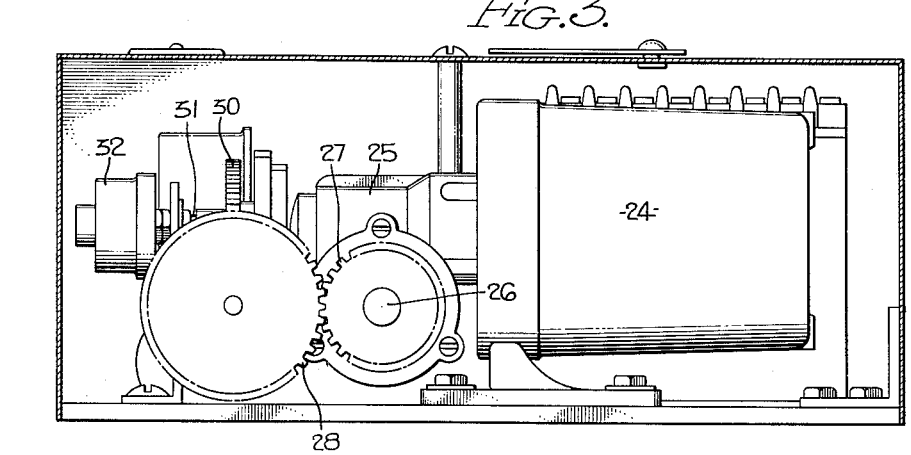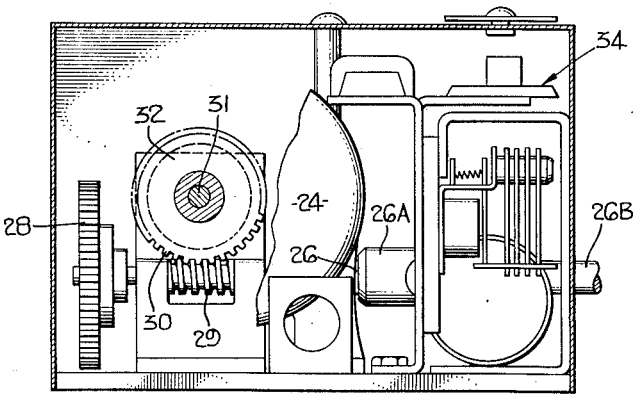

H. DICKINSON 2,980,970

REMOTE CONTROL FOR VANE POSITIONER

Filed May 5, 1958

INVENTOR,
HORACE DICKINSON
BY
Lyon+Lyon
ATTORNEYS

United States Patent Office 2,980,970
Patented Apr. 25, 1961

2,980,970
REMOTE CONTROL FOR VANE POSITIONER

Horace Dickinson, South Gate, Calif., assignor to Lemlar Manufacturing Company, Inc., Gardena, Calif., a corporation of California Filed May 5, 1958, Ser. No. 733,061
4 Claims. (Cl. 20—62)

This invention relates to a remote control unit for the vane positioner of a vertical jalousie, and more particularly to a device of the type described which can be made automatic so as to position the vanes of the jalousie in accordance with the time of day, may be made manual so as to position the vanes of the jalousie in any position desired regardless of the time of day and which has an automatic over-riding device for automatically positioning the vanes in full open position when the light registered on a photocell drops below a minimum value and which will correctly position vanes to exclude direct sunlight if the sky brightness increases above an adjustable predetermined value, or if the "manual" switch is returned to the "automatic" position.

It is accordingly one object of the present invention to provide a device which will perform the foregoing functions.

It is another object of this invention to provide such a device which is positive in action and simple and economic of construction.

These and other objects, features and advantages of the present invention will be apparent from the annexed specification in which:

Figure 2 is a plan view of the motor drive unit;

Figure 3 is a side view of the motor drive unit;

Figure 4 is a left end view of the motor drive unit; and

Figure 1:
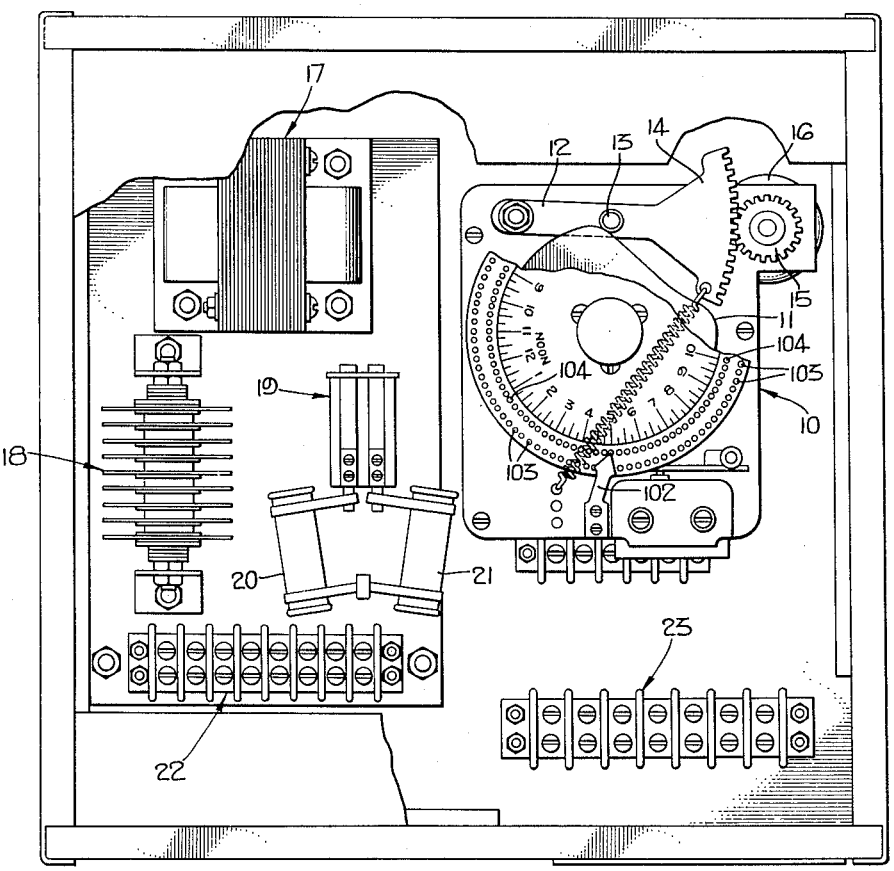
Figure 1 is a side view with parts broken away for clarity of illustration of the clock control unit.

Referring now more particularly to Figure 1, a 24 hour electric clock 10 is arranged to drive a cam 11 while a pivoted arm 12 carries a cam follower 13 adapted to follow the cam 11 and thus position a gear sector 14 formed upon the free end of the arm 12 which through pinion 15 controls the slider of a potentiometer 16.

The clock control unit includes also a transformer 17, a selenium rectifier 18, a relay 19, resistors 20 and 21 and terminal strips 22 and 23. The wiring has been omitted from Figure 1 for clarity of illustration.

Referring now more particularly to Figures 2, 3 and 4, the motor drive unit is seen as including a motor 24, a gear reduction box 25 driving a shaft 26 carrying a gear 27 meshing with a gear 28 which in turn drives a worm 29, which worm drives a gear 30 which turns a shaft 31 connected to the slider of potentiometer 32. The shaft 26 is connected through a universal joint 26A to a shaft 26B which is connected to the vanes for moving the same between fully open and fully closed positions. A housing 33 is provided for the hereinafter described sensitive relays and rectifiers, and overload circuit breaker 34 is also provided. Again, the electrical wiring has been eliminated for clarity of illustration.

Figure 5:
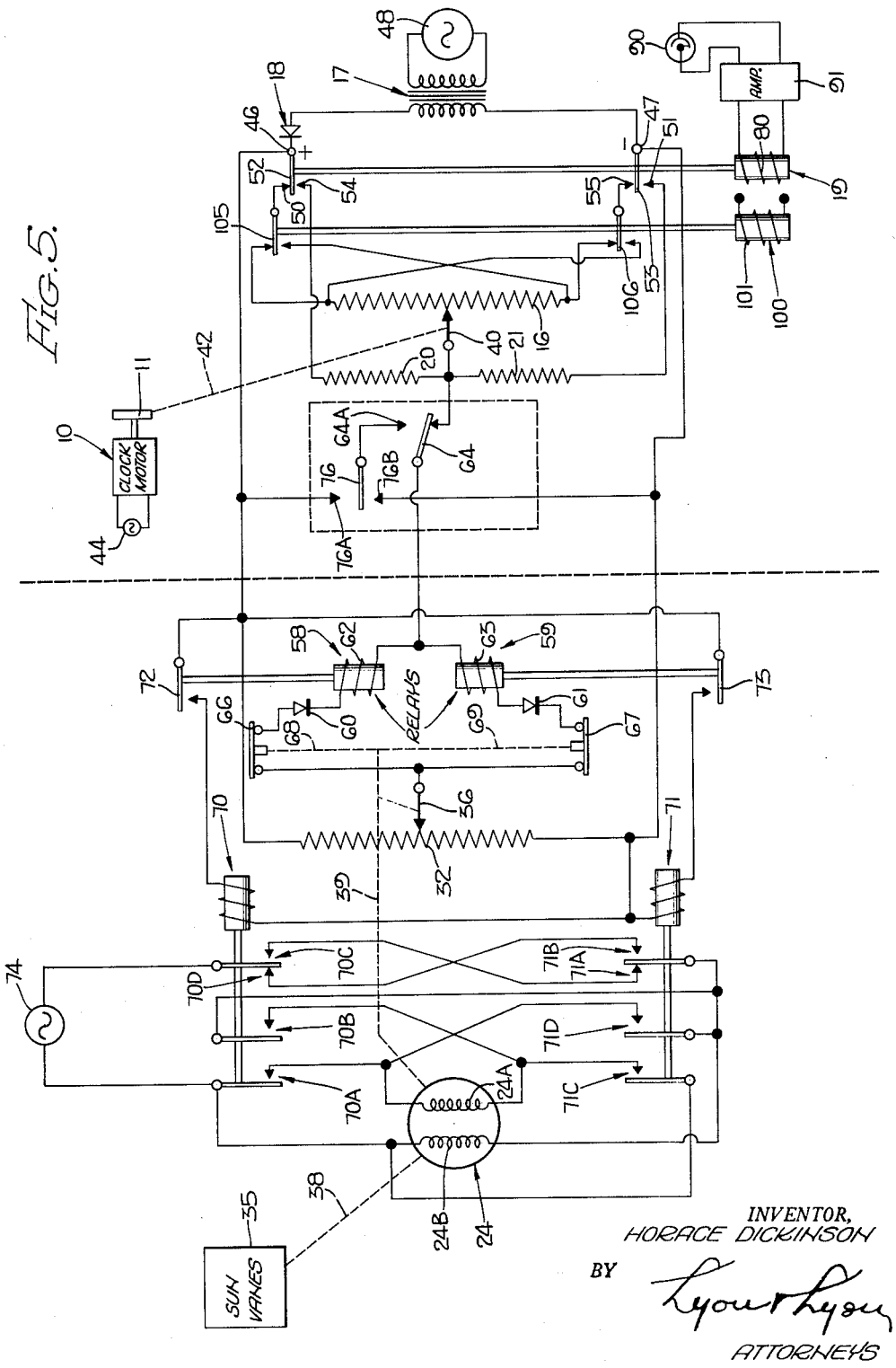
Figure 5 is a diagrammatic view of the electrical circuit involved.

The complete system is illustrated in Figure 5 and as shown therein, the A.C. drive motor 24 is mechanically coupled to position the sun vanes indicated at 35 and also the slider or tap 36 of potentiometer resistance 32, the mechanical connections for accomplishing the same being indicated by the dotted lines 38 and 39. The slider or tap 40 on the other resistance 16 is positioned by the motor driven cam 11 through the mechanical connection indicated by the dotted line 42. The cam 11 is driven by the clock motor 10 which is a synchronous motor energized by the A.C. source 44. This means that the position of tap or slider 40 is time controlled. The shape of the cam 11 is such as to produce the correct vane position versus time relation according to the elevation, latitude and other conditions existing at the locality where the sun vanes 35 are installed.

The resistances 32 and 16 are connected in a self-balancing Wheatstone type bridge circuit and such bridge circuit is energized with a D.C. control voltage which is applied at the terminals 46 and 47, the terminal 46 being positive and the terminal 47 being negative. Such D.C. control voltage is developed by rectifying the voltage from the A.C. source 48, using the rectifier 18.

The resistance 32 has its outside terminals connected respectively to the terminals 46 and 47 whereas the outside terminals of resistance 16 are connectable to the same terminals 46 and 47 through contacts 50 and 51, respectively, of single pole-double throw relay switches 52 and 53, such switches 52 and 53 being operated by the associated relay winding 80 of relay 19.

Resistances 20 and 21 are connected in series between the other relay contacts 54 and 55 and the junction point of these resistances 20 and 21 is connected to tap 40.

It will be observed that the relay switches 52 and 53 thus serve to connect either resistance 16 or the series connected resistances 20 and 21 in a bridge circuit with resistance 32, since the movable arms of switches 52 and 53 are connected respectively to terminals 46 and 47.

The motor 24 is controlled in accordance with the unbalanced voltage existing between taps 36 and 40. For this purpose, a pair of polarized relays 58 and 59 are provided, polarization being effected by the use of diodes 60 and 61.

The junction point of the relay windings 62 and 63 is connected to the tap 40 through the manually operated two-position switch 64. One terminal of winding 62 is connected through diode 60 and limit switch 66 to the tap 36; and, similarly, one terminal of winding 63 is connected through diode 61 and limit switch 67 to the tap 36. These limit switches 66 and 67 are normally closed switches but are opened upon operation of the motor 24 at extreme limits of travel of the sun vanes 35. The manual means for operating such switches 66 and 67 is indicated by the dotted lines 68 and 69.

The polarized relays 58 and 59 selectively control the starting and direction of rotation of the motor 24 by controlling the energization of corresponding relays 70 and 71. Relay 58 has its normally open switch 72 connected between the positive terminal 46 and one terminal of the winding of relay 70, the other terminal of such winding being connected to terminal 47. Similarly, the normally open relay switch 73 of relay 59 is connected between the positive terminal 46 and one terminal of the winding of relay 71, the other terminal of such winding being connected to the negative terminal 47.

The driving motor 24 has two windings 24A and 24B, winding 24A being a reversible field winding and the winding 24B being the armature winding of an A.C. motor. The field winding 24A is selectively energized from the A.C. source 74 by relays 70 and 71 for controlling the direction of rotation of the motor 24. The A.C. voltage is obtained from a source 74.

Normally, the motor 24 is de-energized as shown. When the relay 70 is energized, the motor rotates in one direction with current flowing through the field winding 24A, through the following circuit: From one terminal of source 74, through relay switch 70A, through winding 24A, through relay switch 70B, through the normally closed relay switch 71A, through the relay switch 70C and to the other terminal of source 74. Also, the armature winding 24B is energized through the following path: From one terminal of source 74, through armature winding 24B, through the normally closed relay switch 71A, through relay switch 70C, and to the other terminal of source 74.

Similarly when relay 71 is energized, the motor rotates in the opposite direction with current flowing through the motor winding 24B, through relay switch 71B, through switch 70D and to the other terminal of source 74. At the same time, current flows through the field winding 24A, through the following path: From one terminal of source 74, through the relay switch 71C, through field winding 24A, through relay switch 71D, through relay switch 71B, through relay switch 70D and to the other terminal of source 74.

Relays 70 and 71, respectively, control the directions of rotation of motor 24.

In automatic operation of the system, the clock motor 10 changes the position of the tap 40 to effect an unbalance of the bridge comprising the different sections of resistances 16 and 32. In other words, the voltage between the taps 36 and 40 are no longer equal and when the voltage on tap 36 becomes more positive than the voltage on tap 40, the polarized relay 58 is energized to, in turn, energize relay 70 through switch 72. The motor 24 is then energized to repositon the tap 36, such that the bridge again becomes balanced.

In this bridge balancing process, the sun vanes 35 are moved to a different position determined by the position of cam 11. Similarly, when the voltage on tap 40 is positive with respect to the voltage on tap 36, the other polarized relay 59 is energized to, in turn, energize the relay 71 through relay switch 73. Consequently, the motor 24 rotates in the opposite direction to reposition the tap 36 to again balance the bridge; and in this bridge balancing operation, the sun vanes 35 are moved in the opposite direction.

In order to achieve manual operation, the bridge circuit is rendered ineffective by manually moving the switch 64 to its other position where in the switch arm engages the contact 64A. By then manually moving the switch arm 76 from its neutral position to engagement with either the switch contact 76A or 76B, the motor 24 is rotated to either open or close the vanes 35. Thus, when the switch arm 76 is moved from its neutral position to engagement with the contact 76A, the relay 59 is energized through the following circuit: From the positive terminal 46, through switch contact 76A, through switch contact 64A, through winding 63, diode 61, switch 67, tap 36, the lower section of resistance 32 and to the negative terminal 47, to thereby energize the motor relay 71 and produce movement of the vanes 35 in one direction. When the vanes reach their extreme position, the limit switch 67 is automatically open, thereby interrupting the energizing circuit of relay 59 and causing de-energizaiton of the motor 24. Likewise, when the switch arm 76 is moved to its other position in engagement with contact 76B, the vanes are moved in the opposite direction because the other relay 58 is then energized through the following circuit which extends from the positive terminal 46, through the upper section of resistance 32, through tap 36, through the other limit switch 66, through diode 60, through relay winding 62, through switch contacts 64A and 76B and to the negative terminal 47. Movement of the vanes 35 is thus in the opposite direction because of the resulting energization of motor relay 70. Movement of the vanes 35 may be continued to the other extreme position, at which time the limit switch 66 is opened, thereby interrupting the previously described energization circuit and the motor comes to rest.

Instead of using a motor driven cam 11 to effect positioning of the vanes 35 as previously described, the vanes 35 may be positioned in accordance with light intensity, using for that purpose, photocell 90, the output of which is amplified in amplifier 91 and then applied to the winding of relay 80. When relay 80 is energized, a different bridge circuit is formed by substituting the series connected resistances 20 and 21 for resistance 16. Usually, the photoelectric cell 90 is so connected in the amplifier 91 such that when prevailing outside light falls below a certain level, the relay 80 is energized and the vanes 35 are driven to a wide open position to admit as much light as possible. When the prevailing light increases above a certain level, the relay 80 is de-energized and the vanes 35 are returned to the position established by the tap 40; i.e., by the position of the time controlled cam 11. The relative values of resistances 20 and 21 are selected according to the desired vane position. For a maximum vane opening position, resistances 20 and 21 are approximately of equal value. When resistances 20 and 21 are in the bridge circuit instead of resistance 16, the tap 40 is effectively connected to a voltage about halfway between zero and the full voltage of the source represented by terminals 46 and 47. This causes either relays 58 and 70 or relays 59 and 71 to be energized, according to the existing vane position as sensed by the tap 36. The drive motor 24 will then position the vanes 35 and the tap 36 until the voltage on taps 36 and 40 are approximately equal, at which time the motor 24 is de-energized.

As the sun reaches its highest point on or about 12 o'clock noon, it is desirous to reverse the position of the vanes, i.e. if the vanes were positioned at 30 degrees from fully open to one side, it is desired as the sun passes through its highest point to reverse the vanes to a complementary position on the other side. It is extremely difficult if not impossible to design a cam 11 with a sufficient rapid rise or fall to accomplish this. Accordingly, means is incorporated in this invention accomplishing this reversal electrically. Accordingly, a relay 100 having a winding 101 is actuated by a switch 102 (see Figure 1) which switch is itself actuated by a peg inserted in one of the holes 103 of the clock face. Another peg inserted in the inner circle of holes 104 will open the switch 102. When the switch 102 is closed and the relay 100 energized, double pole switches 105 and 106 are actated to reverse the polarity on the resistance 16. If the vanes are positioned at any other position than 90 degrees, the vanes will thus be caused to travel through the 90 degree position to a complementary angle on the other side.

I claim:

1. A vane positioner for movable vanes of a jalousie comprising: a jalousie including a plurality of movable vanes; an electric motor arranged to drive a vane positioning shaft said vane positioning shaft being operably connected to said vanes; a bridge circuit including a pair of adjustable potentiometers; clock means arranged to movably adjust the wiper of the first potentiometer; means driven by said motor for movably adjusting the wiper of the second potentiometer; an electric circuit including said bridge, a source of direct current, a starting relay and a reversing relay; said circuit being operable upon imbalance in said bridge to energize said motor in a direction to move the wiper of said second potentiometer towards balancing position, whereby said vanes are positioned in accordance with the setting of said clock means; a pair of fixed resistances in series one on each side of the wiper of said first potentiometer and means for substituting said fixed resistances in said bridge whereby said vanes are driven to a position determined by the values of said fixed resistances, said last-mentioned means including a photoelectric cell and a relay operated by said cell when the light thereon falls below a set value to cause said substitution.

2. A vane positioner for movable vanes of a jalousie comprising: a jalousie including a plurality of movable vanes; an electric motor arranged to drive a vane positioning shaft said vane positioning shaft being operably connected to said vanes; a bridge circuit including a pair of adjustable potentiometers; clock means arranged to movably adjust the wiper of the first potentiometer; means driven by said motor for movably adjusting the wiper of the second potentiometer; an electric circuit including said bridge, a source of direct current, a starting relay and a reversing relay; each of said relays having a separate limit switch associated therewith; said circuit being operable upon imbalance in said bridge to energize said motor in a direction to move the wiper of said second potentiometer towards balancing position, whereby said vanes are positioned in accordance with the setting of said clock means; a pair of fixed resistances in series one on each side of the wiper of said first potentiometer and means for substituting said fixed resistances in said bridge whereby said vanes are driven to a position determined by the values of said fixed resistances, said last-mentioned means including a photoelectric cell and a relay operated by said cell when the light thereon falls below a set value to cause said substitution.

3. A vane positioner for movable vanes of a jalousie comprising: a jalousie including a plurality of movable vanes; an electric motor arranged to drive a vane positioning shaft said vane positioning shaft being operably connected to said vanes; a bridge circuit including a pair of adjustable potentiometers; clock means arranged to movably adjust the wiper of the first potentiometer; means driven by said motor for movably adjusting the wiper of the second potentiometer; an electric circuit including said bridge, a source of direct current, a starting relay and a reversing relay; said circuit being operable upon imbalance in said bridge to energize said motor in a direction to move the wiper of said second potentiometer towards balancing position, whereby said vanes are positioned in accordance with the setting of said clock means; a pair of fixed resistances in series one on each side of the wiper of said first potentiometer and means for substituting said fixed resistances in said bridge whereby said vanes are driven to a position determined by the values of said fixed resistances; and means for reversing the polarity of said first potentiometer to cause said vanes to move from one angle from fully open position through fully open position and to a complementary angle on the other side of fully open position and clock controlled means for actuating said last-mentioned means.

4. A vane positioner for movable vanes of a jalousie comprising: a jalousie including a plurality of movable vanes; an electric motor arranged to drive a vane positioning shaft said vane positioning shaft being operably connected to said vanes; a bridge circuit including a pair of adjustable potentiometers; clock means arranged to movably adjust the wiper of the first potentiometer; means driven by said motor for movably adjusting the wiper of the second potentiometer; an electric circuit including said bridge, a source of direct current, a starting relay and a reversing relay; each of said relays having a separate limit switch associated therewith; said circuit being operable upon imbalance in said bridge to energize said motor in a direction to move the wiper of said second potentiometer towards balancing position, whereby said vanes are positioned in accordance with the setting of said clock means; a pair of fixed resistances in series one on each side of the wiper of said first potentiometer and means for substituting said fixed resistances in said bridge whereby said vanes are driven to a position determined by the values of said fixed resistances; and means for reversing the polarity of said first potentiometer to cause said vanes to move from one angle from fully open position through fully open position and to a complementary angle on the other side of fully open position and clock controlled means for actuating said last-mentioned means.

References Cited in the file of this patent
UNITED STATES PATENTS

| | | |
|---|---|---|
| 786,024 | Gomborow | Mar. 28, 1905 |
| 1,525,781 | Sheppard | Feb. 10, 1925 |
| 2,149,481 | Van Bosch et al. | Mar. 7, 1939 |